(12) United States Patent
Hamano et al.

(10) Patent No.: US 11,059,475 B2
(45) Date of Patent: Jul. 13, 2021

(54) INTERLOCK DETERMINATION DEVICE AND DETERMINATION METHOD FOR AUTOMATIC TRANSMISSION

(71) Applicants: JATCO Ltd, Fuji (JP); NISSAN MOTOR CO., LTD., Yokohama (JP)

(72) Inventors: Masahiro Hamano, Atsugi (JP); Yutaka Tohyama, Isehara (JP); Norihira Amano, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/636,527

(22) PCT Filed: Jul. 19, 2018

(86) PCT No.: PCT/JP2018/027004
§ 371 (c)(1),
(2) Date: Feb. 4, 2020

(87) PCT Pub. No.: WO2019/031177
PCT Pub. Date: Feb. 14, 2019

(65) Prior Publication Data
US 2021/0155223 A1 May 27, 2021

(30) Foreign Application Priority Data
Aug. 10, 2017 (JP) .............................. JP2017-154922

(51) Int. Cl.
*B60W 20/20* (2016.01)
*B60W 10/06* (2006.01)
(Continued)

(52) U.S. Cl.
CPC .............. *B60W 20/20* (2013.01); *B60K 6/442* (2013.01); *B60K 6/547* (2013.01); *B60W 10/06* (2013.01);
(Continued)

(58) Field of Classification Search
None
See application file for complete search history.

(56) References Cited

U.S. PATENT DOCUMENTS 5,113,720 A * 5/1992 Asayama ............ F16H 61/0206
477/154
7,690,457 B2 * 4/2010 Nakanowatari ...... B60W 10/115
180/65.265
(Continued)

FOREIGN PATENT DOCUMENTS

JP 2008-232355 A 10/2008
WO WO-2012/057131 A1 5/2012

*Primary Examiner* — Dirk Wright
(74) *Attorney, Agent, or Firm* — Foley & Lardner LLP (57) ABSTRACT

An automatic transmission is arranged in a hybrid driveline employing an EV mode and an HEV mode, and establishes transmission ratio positions by engaging or disengaging frictional elements. A system or method includes: determining, based on a vehicle deceleration and a relationship between a requested transmission ratio position and an actual transmission ratio, whether or not interlocking is occurring, when the automatic transmission is in a state out of transmission shifting, wherein the interlocking is due to erroneous engagement of one of the frictional elements; and inhibiting the determination about interlocking, during a period from start of slip of a first frictional element of the automatic transmission to confirmation of convergence of slip of the first frictional element, in a situation that the first frictional element is slip-engaged for starting the engine in response to a request for mode transition from the EV mode to the HEV mode.

5 Claims, 9 Drawing Sheets

(51) Int. Cl.
*B60W 10/115* (2012.01)
*F16H 61/18* (2006.01)
*B60K 6/442* (2007.10)
*B60K 6/547* (2007.10)
*B60W 20/30* (2016.01)
*B60K 6/365* (2007.10)

(52) U.S. Cl.
CPC .......... *B60W 10/115* (2013.01); *B60W 20/30* (2013.01); *F16H 61/18* (2013.01); *B60K 6/365* (2013.01); *B60W 2510/1005* (2013.01); *B60W 2520/105* (2013.01); *B60W 2710/06* (2013.01); *B60W 2710/1005* (2013.01); *B60Y 2200/92* (2013.01); *F16H 2200/0056* (2013.01); *F16H 2200/2012* (2013.01); *F16H 2200/2048* (2013.01); *F16H 2200/2084* (2013.01)

(56) References Cited

U.S. PATENT DOCUMENTS

| | | | |
|---|---|---|---|
| 7,980,981 B2 | 7/2011 | Kawaguchi | |
| 8,636,620 B2 * | 1/2014 | Nagashima | B60K 6/48 477/5 |
| 8,788,132 B2 * | 7/2014 | Aizawa | B60W 10/02 701/22 |
| 8,880,263 B2 * | 11/2014 | Aizawa | B60K 6/48 701/22 |
| 8,903,585 B2 * | 12/2014 | Tanishima | B60L 15/2054 701/22 |
| 10,000,205 B2 * | 6/2018 | Koshiba | B60K 6/387 |
| 10,668,918 B2 * | 6/2020 | Iwashita | B60K 6/365 |
| 2010/0228451 A1 * | 9/2010 | Hosoya | F16H 61/12 701/51 |
| 2013/0218389 A1 | 8/2013 | Tanishima | |

* cited by examiner

|  | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  |  | ○ |  |
| Rev. | ○ |  |  | ○ |  |  | ○ |  |  |

| GEAR POSITION | ELEMENT ERRONEOUSLY ENGAGED FOR INTERLOCK IN CORRESPONDING GEAR POSITION | FRICTIONAL ELEMENT CAPABLE OF ESTABLISHING GEAR POSITION WHEN DISENGAGED UNDER CORRESPONDING INTERLOCK | GEAR POSITION AFTER DISENGAGEMENT OF CORRESPONDING FRICTIONAL ENGAGEMENT |
|---|---|---|---|
| 4TH SPEED | I/C | 2346/B | 5TH SPEED |
|  | Fr/B |  | 2.5TH SPEED |
| 5TH SPEED | 2346/B | D/C | 6TH SPEED |
|  | Fr/B |  | 7TH SPEED |
| 6TH SPEED | D/C | 2346/B | 5TH SPEED |
|  | Fr/B |  | 7TH SPEED |
| 7TH SPEED | 2346/B | Fr/B | 6TH SPEED |
|  | D/C |  | 5TH SPEED |

FIG.11

FIG.12

INTERLOCK DETERMINATION DEVICE AND DETERMINATION METHOD FOR AUTOMATIC TRANSMISSION

The present disclosure relates to an automatic transmission interlock determination system and an automatic transmission interlock determination method for determining whether or not interlocking is occurring in an automatic transmission.

JP 2008-232355 A corresponding to U.S. Pat. No. 7,980,981 B2 discloses an automatic transmission that includes a planetary gear set and frictional elements, and is structured to establish a requested transmission ratio position by switching each of the frictional elements between an engaged state and a disengaged state, based on commanding about engagement. For such an automatic transmission, there is a known art to calculate a vehicle deceleration and an actual transmission ratio of the automatic transmission, and determine, based on the vehicle deceleration and a relationship between the requested transmission ratio position and the actual transmission ratio, whether or not interlocking is occurring, when the automatic transmission is in a state out of transmission shifting. The word "interlock" means that among the frictional elements of the automatic transmission, one or more of the frictional elements, to which no engagement command is outputted, is engaged.

However, if the art of interlock determination described above is applied to a hybrid vehicle where a mode transition from an EV mode to an HEV mode is implemented by starting an engine while slip-engaging one of the frictional elements (second clutch) of the automatic transmission, there is a possibility of erroneous detection of interlocking. Even if the interlock determination is inhibited while an engine start flag is set during the mode transition from the EV mode to the HEV mode, there is an adverse possibility that erroneous detection of interlocking is caused by occurrence of a reverse transition to the EV mode as described below.

SUMMARY

It is desirable to prevent erroneous detection of interlocking, even with a request for reverse transition to an EV mode while a frictional element is slip-engaged for starting an engine in response to a request for mode transition from the EV mode to an HEV mode.

According to the present disclosure, an automatic transmission interlock determination system includes: an automatic transmission including frictional elements, and structured to establish transmission ratio positions by switching each of the frictional elements between an engaged state and a disengaged state; and an automatic transmission controller including an interlock determination section configured to determine, based on a vehicle deceleration and a relationship between a requested transmission ratio position and an actual transmission ratio, whether or not interlocking is occurring, when the automatic transmission is in a state out of transmission shifting; wherein: the automatic transmission is arranged between a drive source and a driving wheel in a hybrid driveline employing an EV mode and an HEV mode as drive modes, wherein the drive source includes an engine and a motor; the automatic transmission controller includes a determination activation judgment section configured to permit or inhibit the determination of the interlock determination section whether or not interlocking is occurring; and the determination activation judgment section is configured to inhibit the determination about interlocking, during a period from start of slip of a first frictional element of the automatic transmission as one of the frictional elements to confirmation of convergence of slip of the first frictional element, in a situation that the first frictional element is slip-engaged for starting the engine in response to a request for mode transition from the EV mode to the HEV mode.

For example, in a situation that a request for mode transition from the EV mode to the HEV mode occurs, and thereafter a request for reverse transition to the EV mode occurs when the engine is being started and a vehicle is decelerating, the engine start flag is reset with the first frictional element of the automatic transmission slip-engaged. It has been found that when the interlock determination is permitted in response to the resetting of the engine start flag, the automatic transmission may be erroneously determined as being interlocked. Focusing on this point, the present disclosure employs a configuration to inhibit the interlock determination during a period from start of slip of the frictional element to confirmation of convergence of slip of the frictional element. This serves to prevent erroneous detection of interlocking, even with a request for reverse transition to the EV mode (which is a request for mode transition to the EV mode after a request for mode transition from the EV mode to the HEV mode), when the frictional element is slip-engaged for starting the engine in response to the request for mode shift from the EV mode to the HEV mode.

The following describes an automatic transmission interlock determination system according to an embodiment shown in the drawings.

First, the following describes a configuration of an automatic transmission interlock determination system of an FR hybrid vehicle of a one-motor two-clutches type (as an example of hybrid vehicle) according to the embodiment, separately in sections "Overall System Configuration", "Schematic Configuration of Automatic Transmission", and "Configuration of Interlock Determination System".

Figure 1:
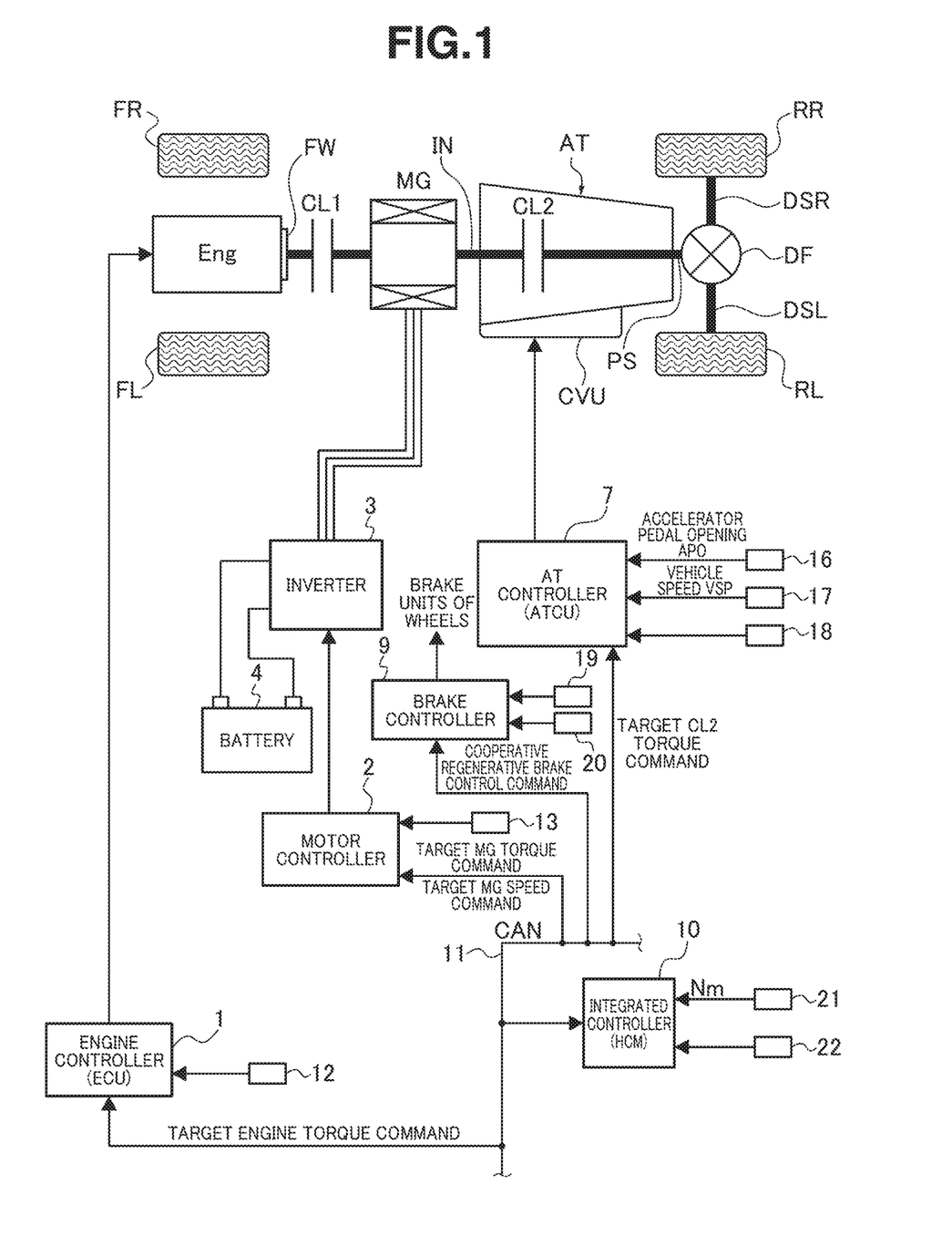
FIG. 1 is an overall system diagram showing a rear-wheel-drive FR hybrid vehicle as an example of hybrid vehicle, to which an automatic transmission interlock determination system according to an embodiment is applied.
Figure 2:
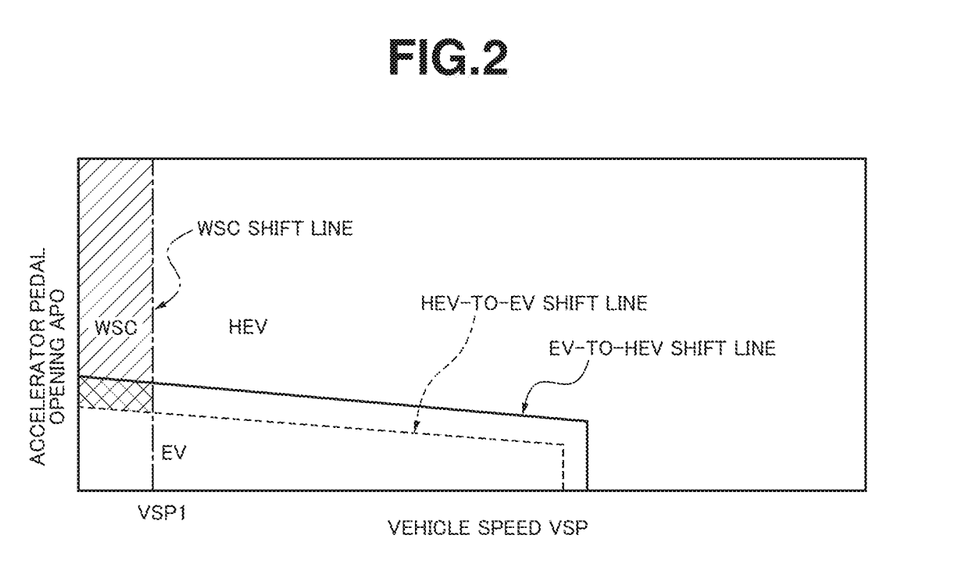
FIG. 2 is a diagram showing an example of EV-HEV selection map set in a mode selection section of an integrated controller according to the embodiment.

[Overall System Configuration] FIG. 1 shows the FR hybrid vehicle to which the automatic transmission interlock determination system according to the embodiment is applied. FIG. 2 shows an example of EV-HEV selection map set in a mode selection section of an integrated controller 10. The following describes overall system configuration with reference to FIGS. 1 and 2.

As shown in FIG. 1, the FR hybrid vehicle includes a driveline that includes an engine "Eng", a first clutch CL1, a motor generator "MG" (motor), a second clutch CL2, an automatic transmission "AT", a transmission input shaft "IN", a propeller shaft "PS", a differential gear "DF", a left drive shaft "DSL", a right drive shaft "DSR", a left rear wheel "RL" (driving wheel), and a right rear wheel "RR" (driving wheel). "FL" represents a left front wheel, "FR" represents a right front wheel, and "FW" represents a flywheel.

First clutch CL1 is a frictional element for mode shifting, which is arranged between engine Eng and motor generator MG, and is structured to be disengaged for an EV mode, and engaged for an HEV mode. First clutch CL1 is of a so-called normally closed dry clutch type that is engaged by a biasing force of a diaphragm spring or the like when being applied with no CL1 hydraulic pressure, and is disengaged when CL1 hydraulic pressure is applied to resist the biasing force.

Automatic transmission AT is a stepwise variable transmission which automatically shifts among seven forward transmission ratio positions and one reverse transmission ratio position, depending on vehicle speed, accelerator opening, etc. Second clutch CL2 is interposed in a section of power transmission path from motor generator MG to left and right rear wheels RL, RR, and is not implemented by an additional clutch independent from automatic transmission AT, but is implemented by a frictional element (clutch or brake) for shifting the automatic transmission AT. Namely, among frictional elements to be engaged in each transmission ratio position of automatic transmission AT, one frictional element is selected as second clutch CL2 in conformance with an engaging condition and others. Incidentally, a hydraulic unit for first clutch CL1 is built in a hydraulic control valve unit "CVU" that is provided with automatic transmission AT.

The FR hybrid vehicle employs modes different in drive form, wherein the modes include an electric vehicle mode (henceforth referred to as "EV mode"), a hybrid vehicle mode (henceforth referred to as "HEV mode"), and a driving torque control mode (henceforth referred to as "WSC mode").

The EV mode is a mode in which first clutch CL1 is disengaged and the vehicle is driven only by motor generator MG. The EV mode includes a motor drive mode (motor power running mode) and a generator power generation mode (generator regeneration mode). The EV mode is selected, for example, when a requested driving force is small and a battery SOC is sufficient.

The HEV mode is a mode in which first clutch CL1 is engaged, and the vehicle is driven by both of engine Eng and motor generator MG. The HEV mode includes a motor assist mode (motor power running mode), an engine power generation mode (generator regeneration mode), and a deceleration regeneration power generation mode (generator regeneration mode). The HEV mode is selected, for example, when the requested driving force is large, or when the battery SOC is insufficient.

The WSC mode is a mode in which the vehicle is driven as in the HEV mode, but a rotational speed control of motor generator MG is performed to maintain second clutch CL2 slip-engaged, and control torque transmission capacity of second clutch CL2, so as to conform a driving torque, which is transmitted through the second clutch CL2, to a requested driving torque that is determined by driver's accelerator operation. The WSC mode is selected, when in a region that the engine speed is below an idle speed, for example, when the vehicle is started with the HEV mode selected.

As shown in FIG. 1, the FR hybrid vehicle includes a control system that includes an engine controller 1, a motor controller 2, an inverter 3, a battery 4, an AT controller 7, a brake controller 9, and an integrated controller 10. Engine controller 1 is referred to as "ECU", AT controller 7 is referred to as "ATCU", and integrated controller 10 is referred to as "HCM".

Controllers 1, 2, 7 and 9, and integrated controller 10 are connected through a CAN communication line 11 for exchanging information with each other. Incidentally, 12 represents an engine speed sensor, 13 represents a resolver, 19 represents a wheel speed sensor, and 20 represents a brake stroke sensor.

AT controller 7 receives input of information from an accelerator opening sensor 16, a vehicle speed sensor 17, an inhibitor switch 18, etc. Inhibitor switch 18 senses a selected range position (N range, D range, R range, P range, etc.). When the vehicle is running with the D range selected, an optimal transmission ratio position is found based on the position of an operating point in a shift schedule not shown, wherein the operating point is defined by an accelerator pedal opening APO and a vehicle speed VSP, and a control command for obtaining the found transmission ratio position is outputted to hydraulic valve control unit CVU. In addition to this shift control, based on a command from integrated controller 10, a control is performed to set the first clutch CL1 in a completely engaged state for the HEV mode, a slip-engaged state for engine starting, and a disengaged state for the EV mode. Furthermore, a control is performed to set the second clutch CL2 in a completely engaged state for the HEV mode, a p-slip-engaged state for the EV mode, a differential speed absorbing slip-engaged state for the WSC mode, and a torque change absorbing slip-engaged mode for engine starting and engine stopping mode.

Integrated controller 10 manages consumed energy of the whole vehicle, and functions to allow the vehicle to travel at an optimized efficiency. Integrated controller 10 receives input of necessary information from a motor rotational speed sensor 21 for measuring motor rotational speed Nm, and other sensors, switches, etc. 22, and input of information through CAN communication line 11. Integrated controller 10 includes a mode selection section configured to select as a target mode a mode that is identified by where the operating point defined by accelerator pedal opening APO and vehicle speed VSP is positioned in the EV-HEV selection map shown in FIG. 2. In response to a request for mode transition from the EV mode to the HEV mode, integrated controller 10 performs an engine start control. During the engine start control, second clutch CL2 is brought into the slip-engaged state by a slip-in control. Thereafter, integrated controller 10 performs engine cranking by motor generator MG as a starter motor with first clutch CL1 slip-engaged, and after engine Eng is brought into a state of self-sustaining operation based on fuel injection and ignition, completely engages first clutch CL1. Furthermore, in response to a request for mode transition from the HEV mode to the EV mode, integrated controller 10 performs an engine stop control by fuel cut, ignition stop, and disengagement of first clutch CL1.

Figure 3:
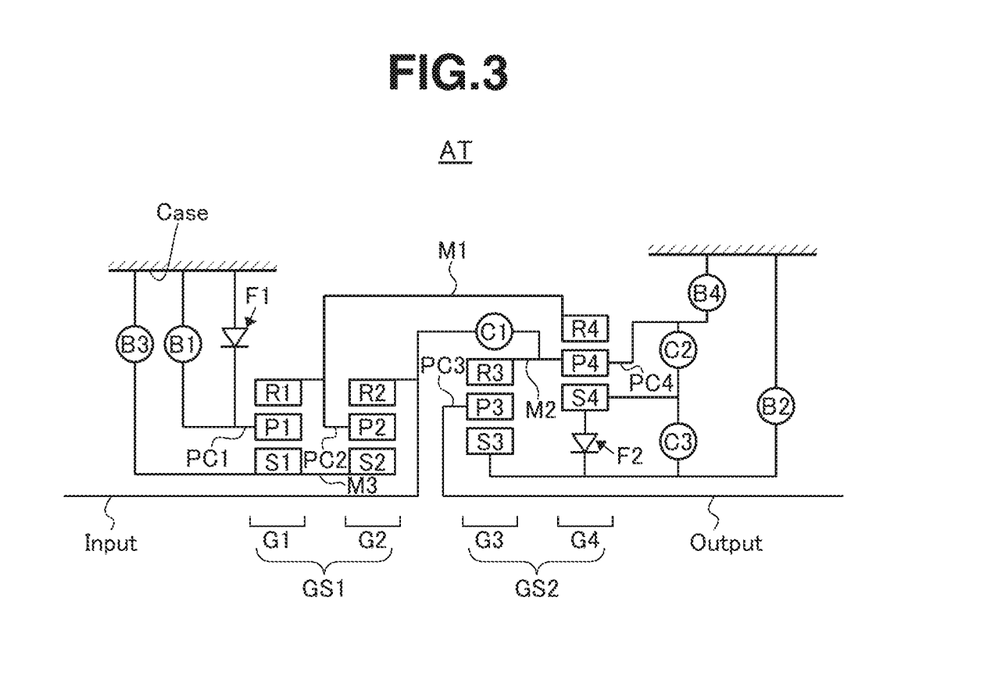
FIG. 3 is a skeleton diagram showing an example of automatic transmission interposed between a motor generator and driving wheels according to the embodiment.
Figure 4:
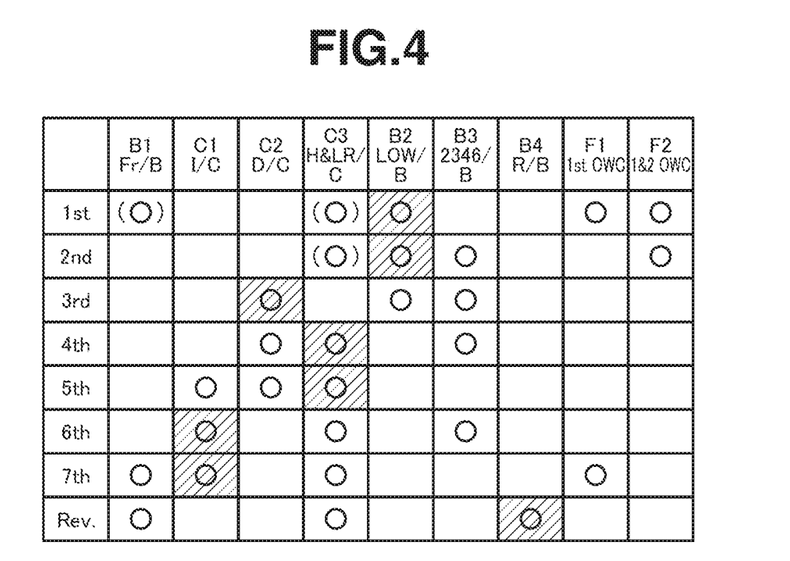
FIG. 4 is an engagement operation table showing an engagement state of each frictional element and which frictional element is a second clutch for each transmission ratio position in the automatic transmission according to the embodiment.

[Schematic Configuration of Automatic Transmission] FIG. 3 is a skeleton diagram showing an example of automatic transmission AT according to the embodiment. FIG. 4 shows engagement states of frictional elements in individual transmission ratio positions in automatic transmission AT. The following describes schematic configuration of automatic transmission AT with reference to FIGS. 3 and 4.

Automatic transmission AT is a seven forward speed and one reverse speed stepwise-variable automatic transmission. As shown in FIG. 3, automatic transmission AT receives input of the driving force of at least one of engine Eng and motor generator MG through a transmission input shaft "Input", and shifts the rotational speed by four planetary gears and seven frictional elements, and outputs it through a transmission output shaft "Output".

Automatic transmission AT includes a speed-shifting gear mechanism including a first planetary gear set GS1 and a second planetary gear set GS2 which are arranged coaxially. First planetary gear set GS1 includes a first planetary gear G1 and a second planetary gear G2. Second planetary gear set GS2 includes a third planetary gear G3 and a fourth planetary gear G4. As hydraulically-operated frictional elements, a first clutch C1, a second clutch C2, a third clutch C3, a first brake B1, a second brake B2, a third brake B3, and a fourth brake B4 are arranged. Moreover, as mechanically-operated engaging elements, a first one-way clutch F1 and a second one-way clutch F2 are arranged.

Each of first planetary gear G1, second planetary gear G2, third planetary gear G3, and fourth planetary gear G4 is a single-pinion planetary gear including a sun gear S1-S4, a ring gear R1-R4, a pinion P1-P4, and a carrier PC1-PC4, wherein pinion P1-P4 meshes with ring gear R1-R4 and is supported by carrier PC1-PC4.

Transmission input shaft Input is coupled to second ring gear R2, and receives input of a driving torque from at least one of engine Eng and motor generator MG. Transmission output shaft Output is coupled to third carrier PC3, and transmits an output driving torque through a final gear and others to the driving wheels (left and right rear wheels RL, RR).

First ring gear R1, second carrier PC2, and fourth ring gear R4 are coupled integrally by a first coupling member M1. Third ring gear R3 and fourth carrier PC4 are coupled integrally by a second coupling member M2. First sun gear S1 and second sun gear S2 are coupled integrally by a third coupling member M3.

FIG. 4 is an engagement operation table. In FIG. 4, each open circle represents a condition that a corresponding frictional element is hydraulically engaged in a drive state, and each bracketed open circle represents a condition that a corresponding frictional element is hydraulically engaged in a coast state (in a drive state, the one-way clutches function), and each blank cell represents a condition that a corresponding frictional element is disengaged. Each hatched cell represents a condition that a corresponding frictional element is engaged and employed as second clutch CL2 for a corresponding transmission ratio position.

As shown in FIG. 4, each of the seven forward transmission ratio positions and one reverse transmission ratio position is obtained by shifting from an adjacent one of the transmission ratio positions by an engagement switch including a shift of one of the frictional elements from an engaged state into a disengaged state, and a shift of another of the frictional elements from a disengaged state into an engaged state. When in the first and second transmission ratio positions, second brake B2 serves as second clutch CL2. When in the third transmission ratio position, second clutch C2 serves as second clutch CL2. When in the fourth and fifth transmission ratio positions, third clutch C3 serves as second clutch CL2. When in the sixth and seventh transmission ratio positions, first clutch C1 serves as second clutch CL2. When in the reverse transmission ratio position, fourth brake B4 serves as second clutch CL2.

Figure 5:
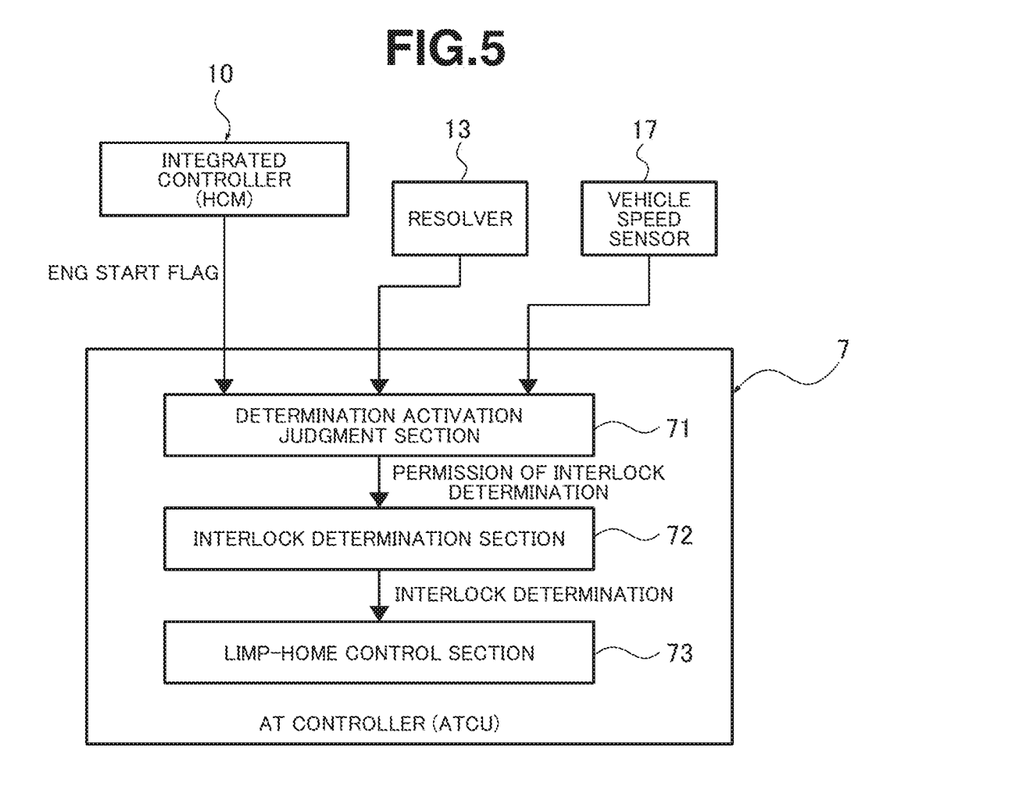
FIG. 5 is a detailed block diagram showing an interlock determination control system of an AT controller according to the embodiment.

[Configuration of Interlock Determination System] FIG. 5 shows a detailed configuration of an interlock determination control system of AT controller 7 according to the embodiment. The following describes overall configuration of the interlock determination system with reference to FIG. 5.

As shown in FIG. 5, the interlock determination control system includes a determination activation judgment section 71, an interlock determination section 72, and a limp-home control section 73 in AT controller 7.

Determination activation judgment section 71 receives input of an "ENG start flag" (ENGSTART) from integrated controller 10, and input of transmission input rotational speed information from resolver 13, and input of transmission output rotational speed information from vehicle speed sensor 17. Based on the inputted information, determination activation judgment section 71 judges whether to permit or inhibit determination by interlock determination section 72 whether or not interlocking is occurring. While second clutch CL2 of automatic transmission AT is slip-engaged for starting the engine Eng in response to a request for mode transition from the EV mode to the HEV mode, determination activation judgment section 71 inhibits the determination about interlocking during a period from a start of slip of second clutch CL2 to a confirmation of convergence of slip of second clutch CL2.

When automatic transmission AT is in a state out of shifting operation, interlock determination section 72 determines whether or not interlocking is occurring in automatic transmission AT, based on a deceleration of the vehicle and a relationship between a selected transmission ratio position and an actual transmission ratio. Interlock determination section 72 executes the determination whether or not interlocking is occurring in automatic transmission AT, when the determination is permitted by determination activation judgment section 71.

When automatic transmission AT is determined by interlock determination section 72 as being interlocked, limp-home control section 73 performs a limp-home control (emergency avoidance control) to maintain the transmission ratio position of automatic transmission AT unchanged, and maintain the drive mode at the EV mode. The following details determination activation judgment section 71, interlock determination section 72, and limp-home control section 73.

Figure 6:
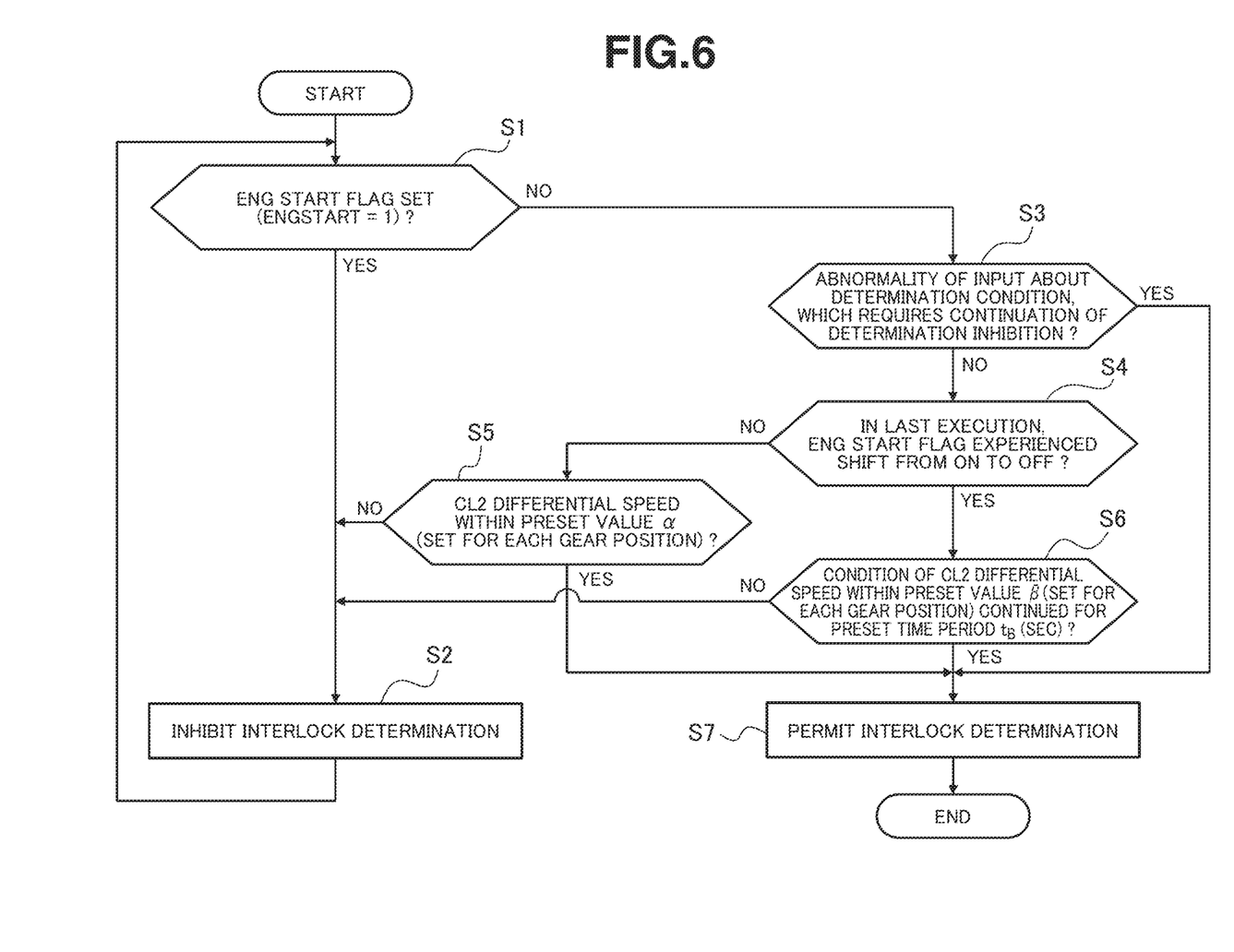
FIG. 6 is a flowchart showing a flow of interlock determination activation judgment process to be executed by a determination activation judgment section of the AT controller according to the embodiment.

<Determination Activation Judgment Section 71> FIG. 6 shows a flow of interlock determination activation judgment process to be executed by determination activation judgment section 71 of AT controller 7 according to the embodiment. The following describes steps in FIG. 6 which constitute determination activation judgment section 71.

At Step S1, following a start of the flowchart or following a judgment of inhibiting the interlock determination at Step S2, determination activation judgment section 71 determines whether or not the ENG start flag (ENGSTART) is set (ENGSTART=1). In case of YES (ENGSTART=1), the process then proceeds to Step S2. In case of NO (ENGSTART=0), the process then proceeds to Step S3. The ENG start flag (ENGSTART) is inputted from integrated controller 10.

At Step S2, following the determination of ENGSTART=1 at Step S1, determination activation judgment section 71 inhibits the interlock determination, and returns to Step S1.

At Step S3, following the judgment of ENGSTART=0 at Step S1, determination activation judgment section 71 determines whether or not an abnormality of input about a determination condition is occurring to require continuation of inhibition of the interlock determination. In case of YES (an abnormality of input about the determination condition is occurring), the process then proceeds to Step S7. In case of NO (the input about the determination condition is normal), the process then proceeds to Step S4. The "abnormality of input about the determination condition" means an abnormality of input required to calculate a CL2 differential speed, such as an abnormality of input of transmission input rotational speed from resolver 13, and an abnormality of input of transmission output rotational speed from vehicle speed sensor 17.

At Step S4, following the determination at Step S3 that the input about the determination condition is normal, determination activation judgment section 71 determines whether or not the ENG start flag (ENGSTART) has already experienced a change from ON (ENGSTART=1) to OFF (ENGSTART=0) in the last execution. In case of YES (ON→OFF experienced), the process then proceeds to Step S6. In case of NO (ON→OFF experienced), the process then proceeds to Step S5.

At Step S5, following the determination at Step S4 that the shift of ON→OFF (first time) is not experienced, determination activation judgment section 71 determines whether or not the CL2 differential speed is within a preset value α (set for each transmission ratio position). In case of YES (the CL2 differential speed≤preset value α), the process then proceeds to Step S7. In case of NO (the CL2 differential speed>preset value α), the process then proceeds to Step S2.

The preset value α is set equal to a slip start determination value (which varies depending on the transmission ratio position, for example, 8 rpm~60 rpm) for the slip-in control of second clutch CL2 in response to an engine start request.

At Step S6, following the determination at Step S4 that the shift of ON→OFF is experienced, determination activation judgment section 71 determines whether or not a condition that the CL2 differential speed is within a preset value β (set for each transmission ratio position) has continued for a preset time period $t_B$ (sec). In case of YES (the condition of CL2 differential speed≤preset value β has continued for $t_B$), the process then proceeds to Step S7. In case of NO (the condition of CL2 differential speed≤preset value β has not continued for $t_B$), the process then proceeds to Step S2.

The preset value β is set equal to a differential speed value (which varies depending on the transmission ratio position, for example, 17 rpm~50 rpm) for preventing erroneous determination about interlocking. The preset time period $t_B$ is set to a time period value (e.g., about 1 sec) with which convergence of slip can be confirmed under a delay of the motor speed control during rapid deceleration.

At Step S7, following the determination at Step S3 that an abnormality of input about the determination condition occurs, or following the determination of CL2 differential speed≤preset value a at Step S5, or following the determination at Step S6 that the condition of CL2 differential speed≤preset value β has continued for $t_B$, determination activation judgment section 71 permits the interlock determination, and then proceeds to an end.

Figure 7:
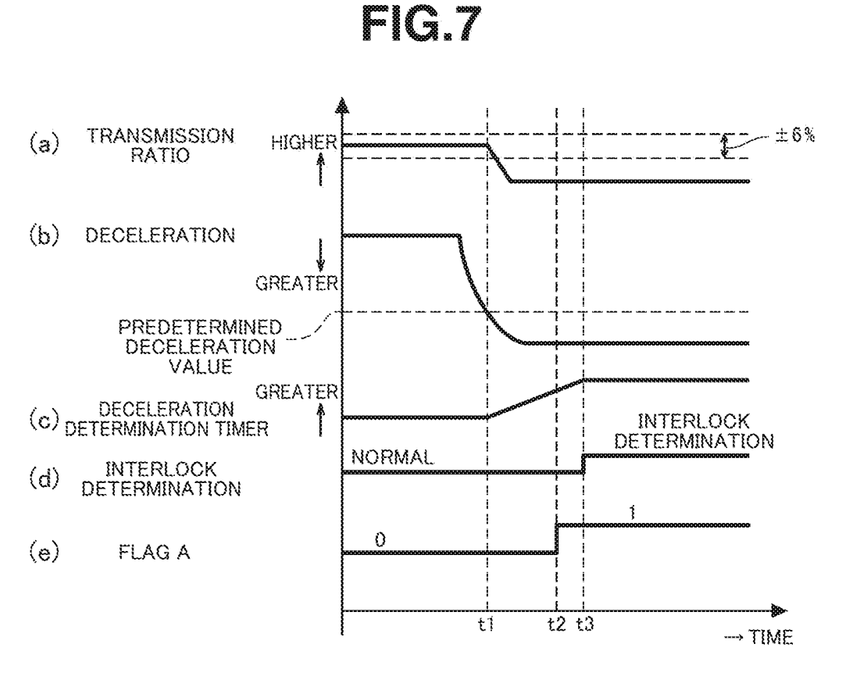
FIG. 7 is a time chart showing an outline of an interlock determination process to be executed by an interlock determination section of the AT controller according to the embodiment.

<Interlock Determination Section 72> FIG. 7 shows an outline of an interlock determination process to be executed by interlock determination section 72 of AT controller 7 according to the embodiment. The following describes behavior of the interlock determination process of FIG. 7 which constitute the interlock determination section 72.

First, at a time instant t1 when the deceleration exceeds a predetermined deceleration value, interlock determination section 72 starts to count up a deceleration determination timer. Then, at a time instant t2 when the deceleration determination timer reaches a time period (t2−t1), interlock determination section 72 starts to determine whether or not the transmission ratio is out of a predetermined range, wherein the time period (t2−t1) is obtained by subtracting a transmission ratio determination time period (t3−t2) from a deceleration determination time period (t3−t1). Since the transmission ratio is out of the predetermined range, a flag A is set to 1. Then, at a time instant t3 when the deceleration determination timer has reached the deceleration determination time period, interlock determination section 72 determines that interlocking is occurring, because of flag A=1.

Figure 8:
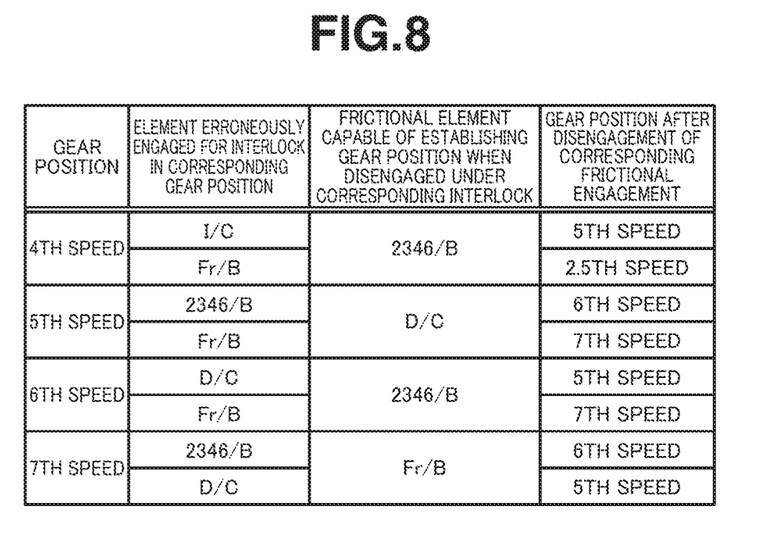
FIG. 8 is a table showing a frictional element to be disengaged in a provisional limp-home control, which is performed by a limp-home control section of the AT controller according to the embodiment after detection of interlocking, for each transmission ratio position.

<Limp-Home Control Section 73> FIG. 8 shows a frictional element to be disengaged in a provisional limp-home control, which is performed by limp-home control section 73 of AT controller 7 according to the embodiment after detection of interlocking, for each transmission ratio position. The following describes the provisional limp-home control performed by limp-home control section 73 with reference to FIG. 8.

When automatic transmission AT is determined by interlock determination section 72 as being interlocked, limp-home control section 73 performs a provisional limp-home control to resolve a condition that the vehicle is running at deceleration greater than the predetermined deceleration value, depending on the current requested transmission ratio position. Specifically, when the current requested transmission ratio position is one of the first to third speed positions, limp-home control section 73 establishes a neutral state by disengaging all of the frictional elements. When the current requested transmission ratio position is one of the fourth to seventh speed positions, a different control for each transmission ratio position is performed in accordance with a table of FIG. 8.

When the requested transmission ratio position is the fourth speed position, limp-home control section 73 disengages third brake B3 (2346-brake). This establishes the fifth speed position if first clutch C1 (input clutch) is erroneously engaged, and establishes a 2.5-speed position when first brake B1 (front brake) is erroneously engaged. The 2.5-speed position is between the second speed position and the third speed position, and is established by a pattern of engagement different from the normal patterns of engagement.

When the requested transmission ratio position is the fifth speed position, limp-home control section 73 disengages second clutch C2 (direct clutch). This establishes the sixth speed position if third brake B3 (2346-brake) is erroneously engaged, and establishes the seventh speed position when first brake B1 (front brake) is erroneously engaged.

When the requested transmission ratio position is the sixth speed position, limp-home control section 73 disengages third brake B3 (2346-brake). This establishes the fifth speed position if second clutch C2 (direct clutch) is erroneously engaged, and establishes the seventh speed position when first brake B1 (front brake) is erroneously engaged.

When the requested transmission ratio position is the seventh speed position, limp-home control section 73 disengages first brake B1 (front brake). This establishes the sixth speed position if third brake B3 (2346-brake) is erroneously engaged, and establishes the fifth speed position when second clutch C2 (direct clutch) is erroneously engaged.

The following describes behavior of the embodiment, separately in sections of "Behavior of Determination Inhibition in Situation of Normal Transition", "Behavior of Determination Inhibition in Situation of CL2 Slip Standby State to EV", "Behavior of Determination Inhibition in Situation of CL2 Engaged State to EV", and "Behavior of Determination Inhibition in Situation of HEV to EV".

Figure 9:
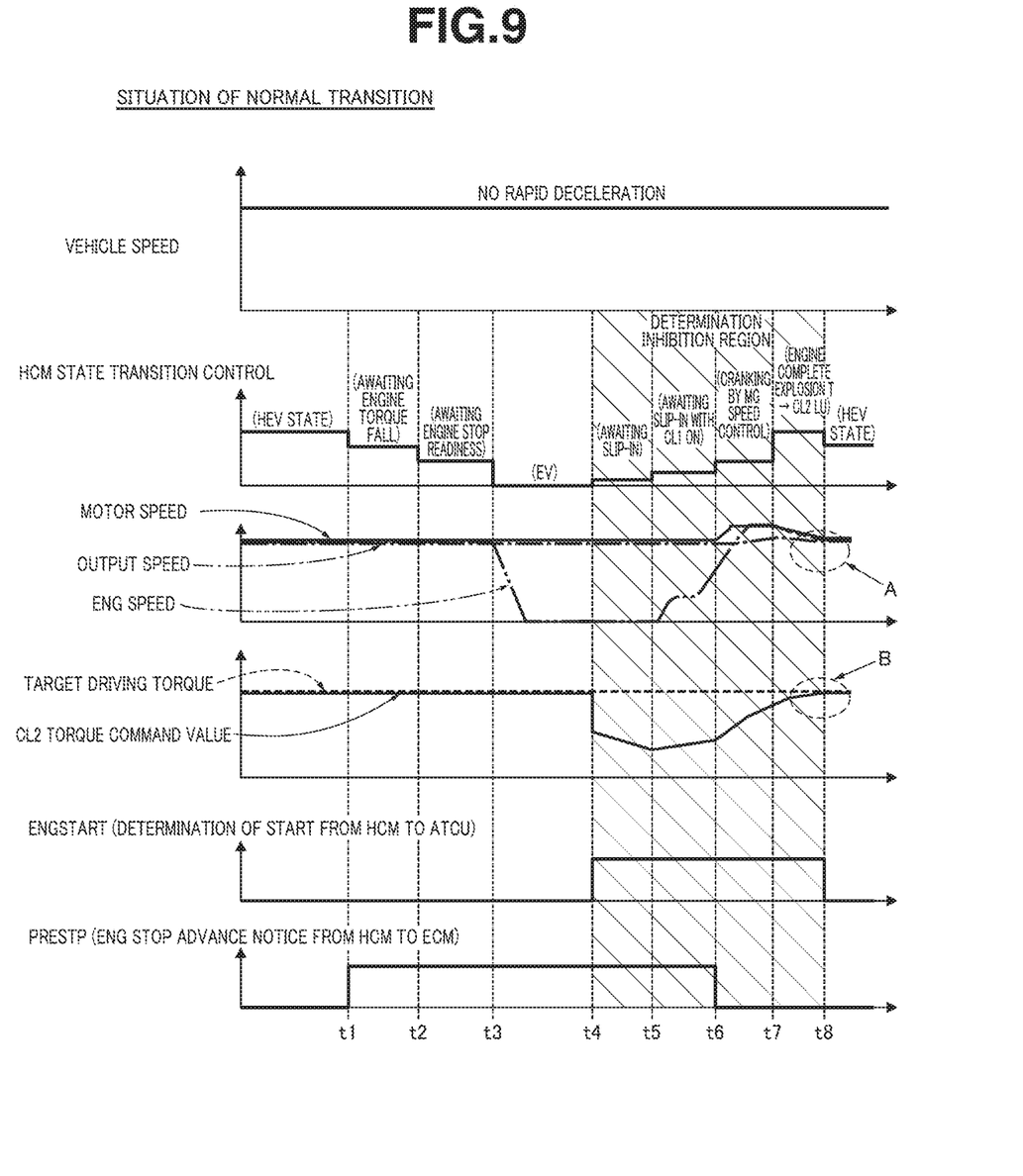
FIG. 9 is a time chart showing characteristics of parameters in a situation of normal transition as HEV mode→EV mode→HEV mode, wherein the parameters include vehicle speed, HCM state transition control, engine speed, motor speed, output rotation speed, target driving torque, CL2 torque command value, engine start flag, and engine stop advance notice flag.

[Behavior of Determination Inhibition in Situation of Normal Transition] FIG. 9 is a time chart showing characteristics of parameters in a situation of normal transition as HEV mode→EV mode→HEV mode. The following describes behavior of the determination inhibition in the situation of normal transition with reference to FIG. 9.

It is a situation of normal transition where a mode transition occurs as HEV mode→EV mode→HEV mode, when the vehicle is running at a constant speed maintained by accelerator operation against a gentle gradient of road surface. In this situation, the HEV mode is employed until a time instant t1. A time period from time instant t1 to a time instant t2 is for awaiting a fall of the engine torque. A time period from time instant t2 to a time instant t3 is for awaiting a condition that the engine is ready to stop. Then, a mode transition to the EV mode occurs. At time instant t3, it shifts into the EV mode. At a time instant t4 when a request for mode shift to the HEV mode is outputted from integrated controller 10, the ENG start flag (ENGSTART) is set simultaneously. On the other hand, an engine stop advance notice from HCM to ECM (PRESTP) is set during a time period from time instant t1 to a time instant t6.

Then, a time period from time instant t4 to a time instant t5 is for awaiting a slip-in action. A time period from time instant t5 to time instant t6 is for awaiting a slip-in action with engagement of CL1 started. A time period from time instant t6 to a time instant t7 is for cranking by MG rotation speed control. A time period from time instant t7 to a time instant t8 is for complete explosion of the engine with CL2 engaged. Then, a mode transition to the HEV mode occurs. In this situation, as indicated by an arrow "A", at time instant t8, the rotational speeds have characteristics satisfying a condition of convergence of CL2 differential speed where the CL2 differential speed in the state of convergence has continued for the preset time period. Simultaneously, as indicated by an arrow "B", the torque parameters have characteristics satisfying a condition about CL2 torque that the CL2 torque is following a target driving torque. In response to satisfaction of these two conditions, the ENG start flag (ENGSTART) is cleared at time instant t8. Namely, the ENG start flag (ENGSTART) is set during a time period from time instant t4 to time instant t8.

Accordingly, in the flowchart shown in FIG. 6, at time instant t4, the process proceeds as Step S1→Step S2, and inhibition of the interlock determination is started. During the time period from time instant t4 to time instant t8, the ENG start flag (ENGSTART) is set so that the flow of Step S1→Step S2 is repeated to continue to inhibit the interlock determination. At time instant t8, the ENG start flag (ENGSTART) is cleared, and the process proceeds first as Step S1→Step S3→Step S4→Step S5. However, at time instant t8, the CL2 differential speed convergence condition has been satisfied, and the CL2 differential speed is within preset value α, so that the process proceeds from Step S5 to Step S7, and the interlock determination is switched from inhibited state to permitted state.

In this way, while the vehicle is running in such a situation of normal transition, the time period when the ENG start flag (ENGSTART) is set, and the time period when the interlock determination is in a region inhibited, are equal to the time period from time instant t4 to time instant t8. At time instant t8, the CL2 differential speed convergence condition is satisfied and second clutch CL2 is engaged. Accordingly, after time instant t8, it is possible to prevent erroneous detection of interlocking even when the interlock determination is permitted.

Figure 10:
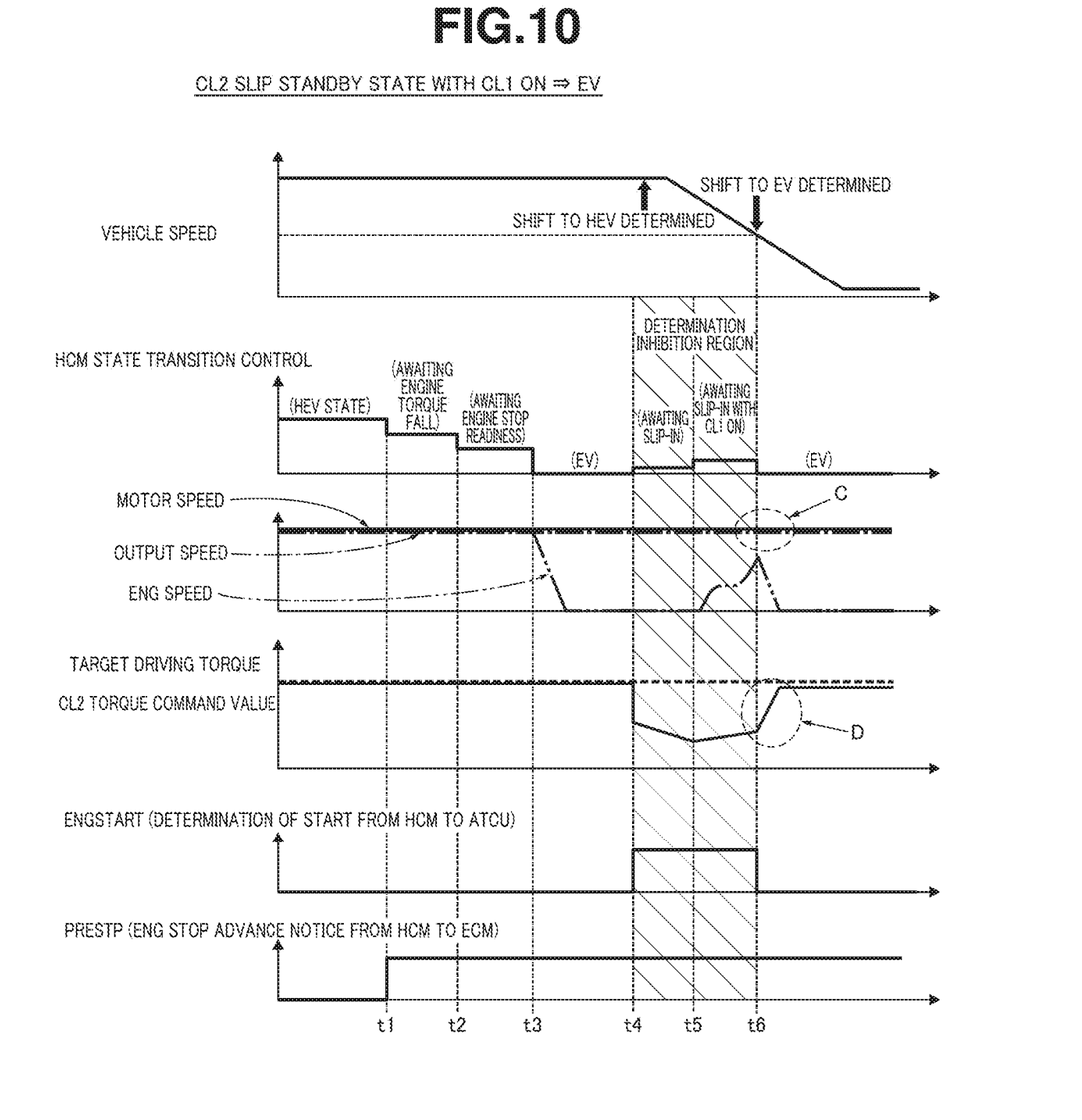
FIG. 10 is a time chart showing characteristics of the parameters in a situation of transition as HEV mode→EV mode→"CL2 on standby for slip with CL1 being ON"→EV mode, wherein the parameters include the vehicle speed, HCM state transition control, engine speed, motor speed, output rotation speed, target driving torque, CL2 torque command value, engine start flag, and engine stop advance notice flag.

[Behavior of Determination Inhibition in Situation of CL2 Slip Standby State to EV] FIG. 10 is a time chart showing characteristics of parameters in a situation of transition as HEV mode→EV mode→CL2 in slip standby state with Cl1 engaged→EV mode. The following describes behavior of the determination inhibition in the situation of CL2 slip standby state→EV mode with reference to FIG. 10.

It is a situation of transition where a mode transition occurs as HEV mode→EV mode→CL2 in slip standby state with C11 engaged→EV mode, wherein the mode transition contains a reverse transition to the EV mode, when the vehicle is running at a constant speed maintained, and is then decelerated rapidly by braking to a halt. In this situation, the HEV mode is employed until a time instant t1. A time period from time instant t1 to a time instant t2 is for awaiting a fall of the engine torque. A time period from time instant t2 to a time instant t3 is for awaiting a condition that the engine is ready to stop. Then, a mode transition to the EV mode occurs. At time instant t3, it shifts into the EV mode. At a time instant t4 when a request for mode shift to the HEV mode is outputted from integrated controller 10, the ENG start flag (ENGSTART) is set simultaneously. On the other hand, the engine stop advance notice from HCM to ECM (PRESTP) is set at and after time instant t1.

Then, a time period from time instant t4 to a time instant t5 is for awaiting a slip-in action. A time period from time instant t5 to time instant t6 is for awaiting a slip-in action with engagement of CL1 started. In this situation, immediately after time instant t4, a deceleration is started to reduce the vehicle speed. At time instant t6 when a request for mode shift to the EV mode is outputted from integrated controller 10, the ENG start flag (ENGSTART) is cleared simultaneously.

As indicated by an arrow "C", at time instant t6, the rotational speeds have characteristics satisfying the CL2 differential speed convergence condition because this period is for awaiting a slip-in action. Simultaneously, as indicated by an arrow "D", the torque parameters have characteristics satisfying a condition of recovery of CL2 torque that the CL2 torque command is recovering to the target driving torque at a constant gradient. Without satisfaction of these two conditions, it does not shift to states (for example, p slip control) other than the EV mode. Thus, the ENG start flag (ENGSTART) is set during a time period from time instant t4 to time instant t6.

Accordingly, in the flowchart shown in FIG. 6, at time instant t4, the process proceeds as Step S1→Step S2, and inhibition of the interlock determination is started. During the time period from time instant t4 to time instant t6, the ENG start flag (ENGSTART) is set so that the flow of Step S1→Step S2 is repeated to continue to inhibit the interlock determination. At time instant t6, the ENG start flag (ENGSTART) is cleared, and the process proceeds first as Step S1→Step S3→Step S4→Step S5. However, at time instant t6, the CL2 differential speed convergence condition has been satisfied, and the CL2 differential speed is within preset value α, so that the process proceeds from Step S5 to Step S7, and the interlock determination is switched from inhibited state to permitted state.

In this way, in the situation of transition of CL2 slip standby state→EV mode, the time period when the ENG start flag (ENGSTART) is set, and the time period when the interlock determination is in the inhibited region, are equal to the time period from time instant t4 to time instant t6. At time instant t6, the CL2 differential speed convergence condition is satisfied and second clutch CL2 is engaged. Accordingly, after time instant t6, it is possible to prevent erroneous detection of interlocking even when the interlock determination is permitted.

Figure 11:
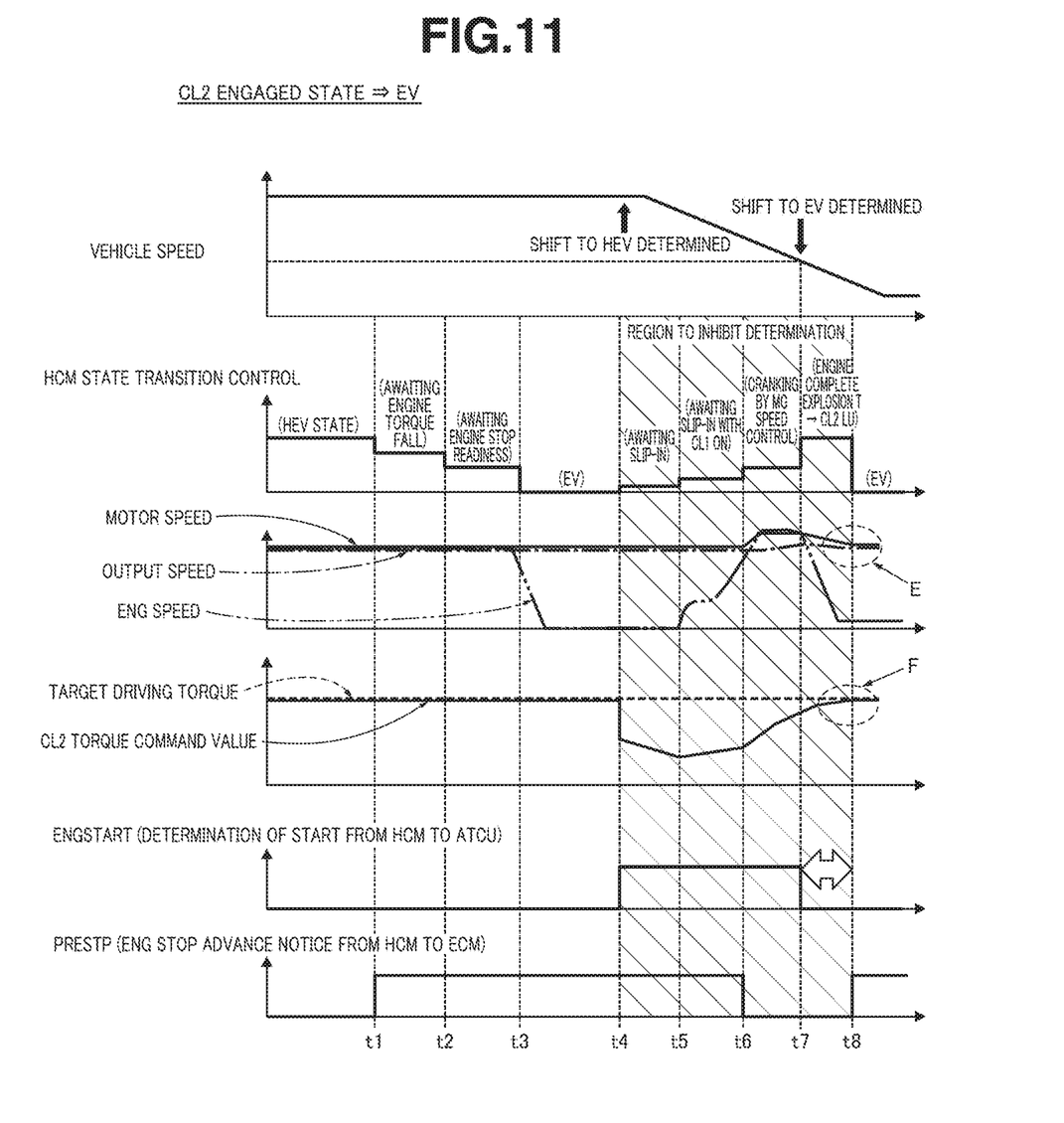
FIG. 11 is a time chart showing characteristics of the parameters in a situation of transition as HEV mode→EV mode→"CL2 engaged"→EV mode, wherein the parameters include the vehicle speed, HCM state transition control, engine speed, motor speed, output rotation speed, target driving torque, CL2 torque command value, engine start flag, and engine stop advance notice flag.

[Behavior of Determination Inhibition in Situation of CL2 Engaged State to EV] FIG. 11 is a time chart showing characteristics of parameters in a situation of transition as HEV mode→EV mode→CL2 in engaged state→EV mode. The following describes behavior of the determination inhibition in the situation of CL2 engaged state→EV mode with reference to FIG. 11.

It is a situation of transition where a mode transition occurs as HEV mode→EV mode→CL2 in engaged state→EV mode, wherein the mode transition contains a reverse transition to the EV mode, when the vehicle is running at a constant speed maintained, and is then decelerated rapidly by braking. In this situation, the HEV mode is employed until a time instant t1. A time period from time instant t1 to a time instant t2 is for awaiting a fall of the engine torque. A time period from time instant t2 to a time instant t3 is for awaiting a condition that the engine is ready to stop. Then, a mode transition to the EV mode occurs. At time instant t3, it shifts into the EV mode. At a time instant t4 when a request for mode shift to the HEV mode is outputted from integrated controller 10, the ENG start flag (ENGSTART) is set simultaneously. On the other hand, the engine stop advance notice from HCM to ECM (PRESTP) is set during a time period from time instant t1 to a time instant t6, and at and after a time instant t8.

Then, a time period from time instant t4 to a time instant t5 is for awaiting a slip-in action. A time period from time instant t5 to time instant t6 is for awaiting a slip-in action with engagement of CL1 started. A time period from time instant t6 to a time instant t7 is for cranking by MG rotation speed control. A time period from time instant t7 to time instant t8 is for complete explosion of the engine with CL2 engaged. In this situation, immediately after time instant t4, a deceleration is started to reduce the vehicle speed. At time instant t7 when a request for mode shift to the EV mode is outputted from integrated controller 10, the ENG start flag (ENGSTART) is cleared simultaneously.

At time instant t7 when the request for mode shift to EV mode is issued, second clutch CL2 is in slipped state with the CL2 differential speed being large, and engagement of second clutch CL2 is started. As indicated by an arrow "E", at time instant t8, the rotational speeds have characteristics satisfying the CL2 differential speed convergence condition. Simultaneously, as indicated by an arrow "F", the torque parameters have characteristics satisfying a condition about CL2 torque that the CL2 torque is following and equal to the target driving torque. Without satisfaction of these two conditions, it does not shift to states (for example, p slip control) other than the EV mode. Thus, the ENG start flag (ENGSTART) is set during a time period from time instant t4 to time instant t7.

Accordingly, in the flowchart shown in FIG. 6, at time instant t4, the process proceeds as Step S1→Step S2, and inhibition of the interlock determination is started. During the time period from time instant t4 to time instant t7, the ENG start flag (ENGSTART) is set so that the flow of Step S1→Step S2 is repeated to continue to inhibit the interlock determination. At time instant t7, the ENG start flag (ENGSTART) is cleared, and the process proceeds first as Step S1→Step S3→Step S4→Step S5. However, at time instant t7, the CL2 differential speed convergence condition is unsatisfied, and the CL2 differential speed is beyond preset value α, so that the process proceeds from Step S5 to Step S2, and the interlock determination continues to be inhibited.

At a next execution and later, the process proceeds as Step S1→Step S3→Step S4→Step S6. At Step S6, it is determined whether or not the condition that the CL2 differential speed is within the preset value β (set for each transmission ratio position) has continued for the preset time period $t_B$ (sec). While the CL2 differential speed convergence condition at Step S6 is unsatisfied, the process proceeds from Step S6 to Step S2, and the inhibition of the interlock determination is continued. However, at time instant t8 when the CL2 differential speed convergence condition at Step S6 is satisfied, the process proceeds from Step S6 to Step S7. At Step S7, the interlock determination is switched from inhibited state to permitted state.

In this way, in the situation of transition of CL2 engaged state→EV mode, the time period when the ENG start flag (ENGSTART) is set (from time instant t4 to time instant t7), and the time period when the interlock determination is in the inhibited region (from time instant t4 to time instant t8), are not equal to each other. The time period when the interlock determination is in the inhibited region is set by adding an extended time period (from time instant t7 to time instant t8) to the time period when the ENG start flag (ENGSTART) is set (from time instant t4 to time instant t7). At time instant t8, the CL2 differential speed convergence condition is satisfied and second clutch CL2 is engaged. Accordingly, after time instant t8, it is possible to prevent erroneous detection of interlocking even when the interlock determination is permitted. Incidentally, interlock determination section 72 determines, based on the vehicle deceleration and the relationship between the requested transmission ratio position and the actual transmission ratio, whether or not interlocking is occurring in automatic transmission AT, when automatic transmission AT is in a state out of transmission shifting. Therefore, even if the interlock determination is inhibited only while the ENG start flag (ENGSTART) is set (from time instant t4 to time instant t7), after the flag is reset, the CL2 differential speed (slip) remains so that the actual transmission ratio is determined as abnormal, resulting in erroneous detection of interlocking.

Figure 12:
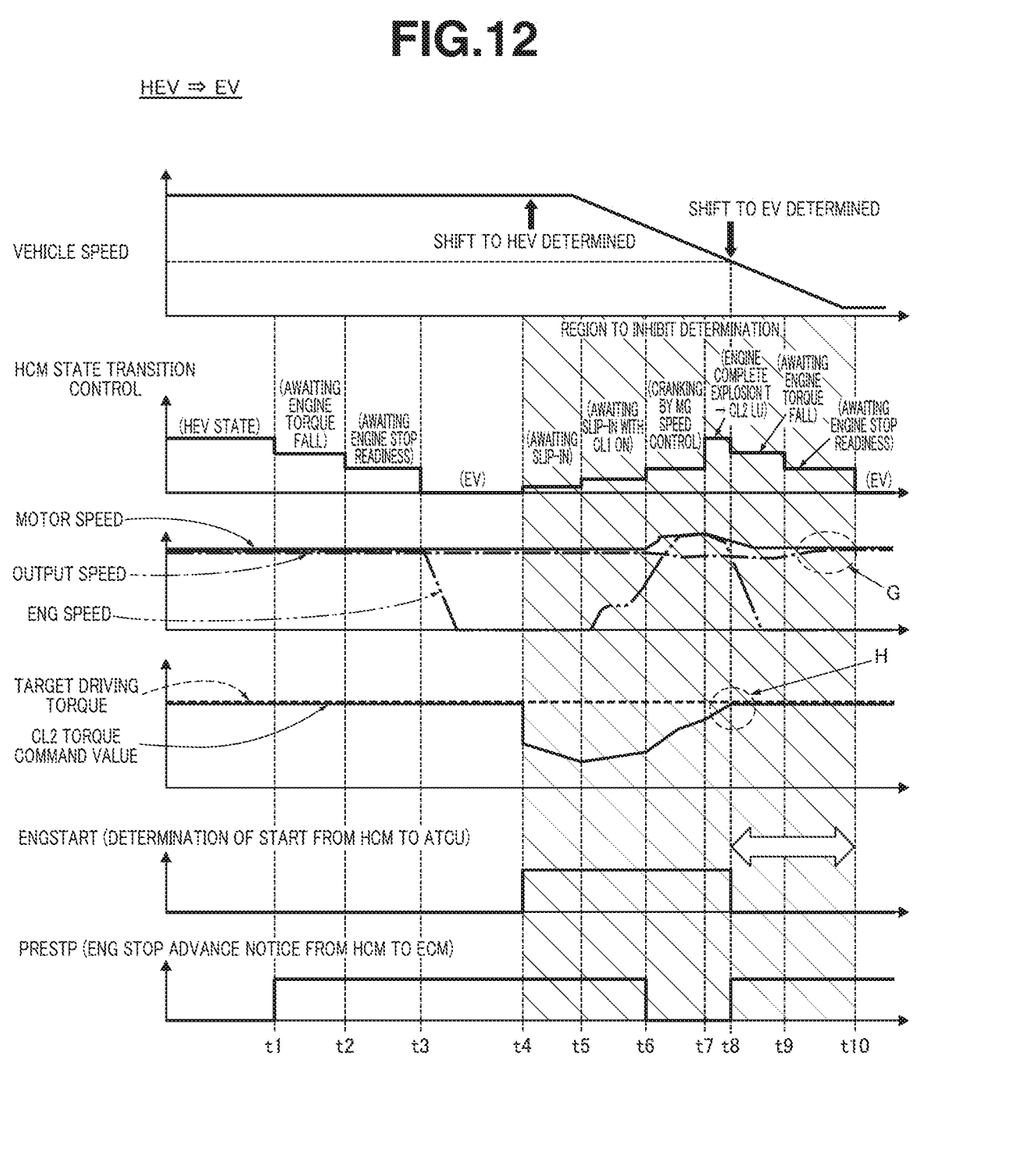
FIG. 12 is a time chart showing characteristics of the parameters in a situation of transition as HEV mode→EV mode→HEV mode→EV mode, wherein the parameters include the vehicle speed, HCM state transition control, engine speed, motor speed, output rotation speed, target driving torque, CL2 torque command value, engine start flag, and engine stop advance notice flag.

[Behavior of Determination Inhibition in Situation of HEV to EV] FIG. 12 is a time chart showing characteristics of parameters in a situation of transition as HEV mode→EV mode→HEV mode→EV mode. The following describes behavior of the determination inhibition in the situation of HEV to EV with reference to FIG. 12.

It is a situation of transition where a mode transition occurs as HEV mode→EV mode→HEV mode→EV mode, wherein the mode transition contains a reverse transition to the EV mode, when the vehicle is running at a constant speed maintained, and is then decelerated rapidly by braking. In this situation, the HEV mode is employed until a time instant t1. A time period from time instant t1 to a time instant t2 is for awaiting a fall of the engine torque. A time period from time instant t2 to a time instant t3 is for awaiting a condition that the engine is ready to stop. Then, a mode transition to the EV mode occurs. At time instant t3, it shifts into the EV mode. At a time instant t4 when a request for mode shift to the HEV mode is outputted from integrated controller 10, the ENG start flag (ENGSTART) is set simultaneously. On the other hand, the engine stop advance notice from HCM to ECM (PRESTP) is set during a time period from time instant t1 to a time instant t6, and at and after a time instant t8.

Then, a time period from time instant t4 to a time instant t5 is for awaiting a slip-in action. A time period from time instant t5 to time instant t6 is for awaiting a slip-in action with engagement of CL1 started. A time period from time instant t6 to a time instant t7 is for cranking by MG rotation speed control. A time period from time instant t7 to time instant t8 is for complete explosion of the engine with CL2 engaged. In this situation, immediately after time instant t4, a deceleration is started to reduce the vehicle speed. At time instant t8 when a request for mode shift to the EV mode is outputted from integrated controller 10, the ENG start flag (ENGSTART) is cleared simultaneously. During a time period from time instant t7 to time instant t8, the HEV mode is employed. A time period from time instant t8 to a time instant t9 is for awaiting a fall of the engine torque. A time period from time instant t9 to a time instant t10 is for awaiting a condition that the engine is ready to stop. Then, at time instant t10, a mode transition to the EV mode occurs.

At time instant t8 when the request for reverse mode shift to EV mode is issued, it is in a failsafe mode allowing a shock due to engine stop during rapid deceleration, so that the CL2 differential speed convergence determination about second clutch CL2 is not executed. At time instant t8, an engine stop control is started, and at time instant t10, a mode transition occurs to the EV mode. Accordingly, as indicated by an arrow "G", after waiting until time instant t10, the rotational speeds have characteristics satisfying the CL2 differential speed convergence condition. On the other hand, as indicated by an arrow "H", the torque parameters have characteristics satisfying a CL2 torque recovery condition that the CL2 torque is increased to be equal to the target driving torque by a rapid increase of the CL2 torque command. Without satisfaction of these two conditions, it does not shift to states (for example, p slip control) other than the EV mode. Thus, the ENG start flag (ENGSTART) is set during a time period from time instant t4 to time instant t8.

Accordingly, in the flowchart shown in FIG. 6, at time instant t4, the process proceeds as Step S1→Step S2, and inhibition of the interlock determination is started. During the time period from time instant t4 to time instant t8, the ENG start flag (ENGSTART) is set so that the flow of Step S1→Step S2 is repeated to continue to inhibit the interlock determination. At time instant t8, the ENG start flag (ENGSTART) is cleared, and the process proceeds first as Step S1→Step S3→Step S4→Step S5. However, at time instant t8, the CL2 differential speed convergence condition is unsatisfied, so that the process proceeds from Step S5 to Step S2, and the interlock determination continues to be inhibited.

At a next execution and later, the process proceeds as Step S1→Step S3→Step S4→Step S6. At Step S6, it is determined whether or not the condition that the CL2 differential speed is within the preset value β (set for each transmission ratio position) has continued for the preset time period $t_B$ (sec). While the CL2 differential speed convergence condition at Step S6 is unsatisfied, the process proceeds from Step S6 to Step S2, and the inhibition of the interlock determination is continued. However, at time instant t10 when the CL2 differential speed convergence condition at Step S6 is satisfied, the process proceeds from Step S6 to Step S7. At Step S7, the interlock determination is switched from inhibited state to permitted state.

In this way, in the situation of transition of HEV→EV, the time period when the ENG start flag (ENGSTART) is set (from time instant t4 to time instant t8), and the time period when the interlock determination is in the inhibited region (from time instant t4 to time instant t10), are not equal to each other. The time period when the interlock determination is in the inhibited region is set by adding an extended time period (from time instant t8 to time instant t10) to the time period when the ENG start flag (ENGSTART) is set (from time instant t4 to time instant t8). At time instant t10, the CL2 differential speed convergence condition is satisfied and second clutch CL2 is engaged. Accordingly, after time instant t10, it is possible to prevent erroneous detection of interlocking even when the interlock determination is permitted.

The following describes effects obtained by the interlock determination system for automatic transmission AT according to the embodiment.

<1> The automatic transmission interlock determination system includes: an automatic transmission (AT) including frictional elements, and structured to establish transmission ratio positions by switching each of the frictional elements between an engaged state and a disengaged state; and an automatic transmission controller (AT controller 7) including an interlock determination section (72) configured to determine, based on a vehicle deceleration and a relationship between a requested transmission ratio position and an actual transmission ratio, whether or not interlocking is occurring, when the automatic transmission (AT) is in a state out of transmission shifting; wherein: the automatic transmission (AT) is arranged between a drive source and a driving wheel (left and right rear wheels RL, RR) in a hybrid driveline employing an EV mode and an HEV mode as drive modes, wherein the drive source includes an engine (Eng) and a motor (motor generator MG); the automatic transmission controller (AT controller 7) includes a determination activation judgment section (71) configured to permit or inhibit the determination of the interlock determination section (72) whether or not interlocking is occurring; and the determination activation judgment section (71) is configured to inhibit the determination about interlocking, during a period from start of slip of a first frictional element (second clutch CL2) of the automatic transmission (AT) as one of the frictional elements to confirmation of convergence of slip of the first frictional element (second clutch CL2), in a situation that the first frictional element (second clutch CL2) is slip-engaged for starting the engine (Eng) in response to a request for mode transition from the EV mode to the HEV mode (FIG. 5). This serves to prevent erroneous detection of interlocking, even in such a situation that the frictional element (second clutch CL2) is slip-engaged to start the engine in response to the request for mode transition from the EV mode to the HEV mode, and a request for reverse transition to the EV mode occurs. This serves to prevent a problem that although the automatic transmission (AT) is normal, interlocking is erroneously detected, and it is fixed to the EV mode as a failsafe function.

<2> The automatic transmission interlock determination system further includes a hybrid controller (integrated controller 10), wherein: the hybrid controller (integrated controller 10) is configured to: set an engine start flag (ENG start flag) for starting the engine (Eng) in response to the request for mode transition from the EV mode to the HEV mode; and reset the engine start flag (ENG start flag) in response to a request for mode transition from the HEV mode to the EV mode; and the determination activation judgment section (71) is configured to: read the engine start flag (ENG start flag); inhibit the determination about interlocking, while the engine start flag (ENG start flag) is determined as being set; and continue to inhibit the determination about interlocking, until convergence of slip of the first frictional element (second clutch CL2) is confirmed, by monitoring a state of slip of the first frictional element (second clutch CL2) with reference to a differential speed of the first frictional element (second clutch CL2), while the engine start flag (ENG start flag) is determined as being reset (FIG. 6). In addition to the effect of <1>, the feature that it is based on the determination activation judgment process based on the engine start flag (ENG start flag) as input information, serves to prevent by the simple process erroneous detection of interlocking even with presence of a request for reverse mode transition to the EV mode.

<3> The determination activation judgment section (71) is configured to: continue to inhibit the determination about interlocking, in response to a condition that the differential speed of the first frictional element (second clutch CL2) is greater than a slip start determination value (preset value α) about a slip-in control for slipping the first frictional element (second clutch CL2), in a situation that the engine start flag (ENG start flag) shifts from a state of being set to a state of being reset (see S5→S2 in FIG. 6); and permit the determination about interlocking, in response to a condition that the differential speed of the first frictional element (second clutch CL2) is less than or equal to the slip start determination value (preset value α), in the situation that the engine start flag (ENG start flag) shifts from the state of being set to the state of being reset (see S5→S7 in FIG. 6). In addition to the effect of <2>, this serves to responsively permit the interlock determination in a situation that the timing of resetting the engine start flag (ENG start flag) is identical to the timing of convergence of the CL2 differential speed (see FIGS. 9 and 10).

<4> The determination activation judgment section (71) is configured to: inhibit the determination about interlocking, until a first condition has continued for a preset time period ($t_B$), in a situation that the engine start flag (ENG start flag) is reset, wherein the first condition is a condition that the differential speed of the first frictional element (second clutch CL2) is within a preset value (G3) within which the determination about interlocking is prevented from causing an error (see S6→S2 in FIG. 6); and permit the determination about interlocking, when the first condition has continued for the preset time period ($t_B$), in the situation that the engine start flag (ENG start flag) is reset (see S6→S7 in FIG. 6). In addition to the effect of <2> or <3>, this serves to reliably prevent erroneous detection of interlocking, in a situation that a request for reverse mode transition to EV is present so that the timing of resetting the engine start flag (ENG start flag) is not identical to the timing of convergence of the CL2 differential speed (see FIGS. 11 and 12).

Although the automatic transmission interlock determination system according to the present disclosure is described with reference to the embodiment, specific configuration is not limited to the embodiment, but may be applied with design modification or design addition unless going beyond the subject matter defined by the claims.

In the embodiment, determination activation judgment section 71 is based on determination activation judgment based on the ENG start flag (ENGSTART) from integrated controller 10 as input information. However, without input of the ENG start flag (ENGSTART), the determination activation judgment section may be configured to monitor the CL2 differential speed and inhibit the interlock determination during a time period from start of slip to convergence of slip, in a situation that a request for mode transition to the EV mode is present.

In the embodiment, automatic transmission AT is a stepwise variable transmission having seven forward transmission ratio positions and one reverse transmission ratio position. However, the automatic transmission may be configured differently to have different transmission ratio positions than seven forward transmission ratio positions, or have different reverse transmission ratio positions than one reverse transmission ratio position. Namely, the automatic transmission may be configured differently if it includes a planetary gear and frictional elements, and is structured to establish transmission ratio positions by switching each of the frictional elements between an engaged state and a disengaged state, and slip-engage one of the frictional elements.

In the embodiment, the automatic transmission interlock determination system according to the present invention is applied to the FR hybrid vehicle including the one motor and two clutches driveline. However, the automatic transmission interlock determination system according to the present invention may be naturally applied to an FF hybrid vehicle including one motor and two clutches driveline, and also may be applied to a hybrid vehicle of a parallel type that includes a power splitting mechanism for shifting between EV mode and HEV mode.

The invention claimed is:

1. An automatic transmission interlock determination system comprising:
an automatic transmission including frictional elements, and structured to establish transmission ratio positions by switching each of the frictional elements between an engaged state and a disengaged state; and an automatic transmission controller including an interlock determination section configured to determine, based on a vehicle deceleration and a relationship between a requested transmission ratio position and an actual transmission ratio, whether or not interlocking is occurring, when the automatic transmission is in a state out of transmission shifting, wherein the interlocking is due to erroneous engagement of one of the frictional elements;

wherein:

the automatic transmission is arranged between a drive source and a driving wheel in a hybrid driveline employing an EV mode and an HEV mode as drive modes, wherein the drive source includes an engine and a motor;

the automatic transmission controller includes a determination activation judgment section configured to permit or inhibit the determination of the interlock determination section whether or not interlocking is occurring; and the determination activation judgment section is configured to inhibit the determination about interlocking, during a period from start of slip of a first frictional element of the automatic transmission as one of the frictional elements to confirmation of convergence of slip of the first frictional element, in a situation that the first frictional element is slip-engaged for starting the engine in response to a request for mode transition from the EV mode to the HEV mode.

2. The automatic transmission interlock determination system as claimed in claim 1, further comprising a hybrid controller, wherein:

the hybrid controller is configured to:

set an engine start flag for starting the engine in response to the request for mode transition from the EV mode to the HEV mode; and reset the engine start flag in response to a request for mode transition from the HEV mode to the EV mode; and the determination activation judgment section is configured to:

read the engine start flag;

inhibit the determination about interlocking, while the engine start flag is determined as being set; and continue to inhibit the determination about interlocking, until convergence of slip of the first frictional element is confirmed, by monitoring a state of slip of the first frictional element with reference to a differential speed of the first frictional element, while the engine start flag is determined as being reset.

3. The automatic transmission interlock determination system as claimed in claim 2, wherein the determination activation judgment section is configured to:

continue to inhibit the determination about interlocking, in response to a condition that the differential speed of the first frictional element is greater than a slip start determination value about a slip-in control for slipping the first frictional element, in a situation that the engine start flag shifts from a state of being set to a state of being reset; and permit the determination about interlocking, in response to a condition that the differential speed of the first frictional element is less than or equal to the slip start determination value, in the situation that the engine start flag shifts from the state of being set to the state of being reset.

4. The automatic transmission interlock determination system as claimed in claim 2, wherein the determination activation judgment section is configured to:

inhibit the determination about interlocking, until a first condition has continued for a preset time period, in a situation that the engine start flag is reset, wherein the first condition is a condition that the differential speed of the first frictional element is within a preset value within which the determination about interlocking is prevented from causing an error; and permit the determination about interlocking, when the first condition has continued for the preset time period, in the situation that the engine start flag is reset.

5. An automatic transmission interlock determination method for an automatic transmission, wherein:

the automatic transmission includes frictional elements, and is structured to establish transmission ratio positions by switching each of the frictional elements between an engaged state and a disengaged state;

the automatic transmission is arranged between a drive source and a driving wheel in a hybrid driveline employing an EV mode and an HEV mode as drive modes, wherein the drive source includes an engine and a motor; and the automatic transmission interlock determination method comprises:

determining, based on a vehicle deceleration and a relationship between a requested transmission ratio position and an actual transmission ratio, whether or not interlocking is occurring, when the automatic transmission is in a state out of transmission shifting, wherein the interlocking is due to erroneous engagement of one of the frictional elements; and inhibiting the determination about interlocking, during a period from start of slip of a first frictional element of the automatic transmission as one of the frictional elements to confirmation of convergence of slip of the first frictional element, in a situation that the first frictional element is slip-engaged for starting the engine in response to a request for mode transition from the EV mode to the HEV mode.

* * * * *